United States Patent
Pickard et al.

(10) Patent No.: US 10,365,292 B2
(45) Date of Patent: Jul. 30, 2019

(54) SPEED SENSING SYSTEM

(71) Applicant: Rolls-Royce Corporation, Indianapolis, IN (US)

(72) Inventors: Andrew C. Pickard, Indianapolis, IN (US); John J. Costello, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 344 days.

(21) Appl. No.: 15/142,354

(22) Filed: Apr. 29, 2016

(65) Prior Publication Data

US 2016/0334434 A1 Nov. 17, 2016

Related U.S. Application Data

(60) Provisional application No. 62/160,205, filed on May 12, 2015.

(51) Int. Cl.
| | |
|---|---|
| *G01P 3/44* | (2006.01) |
| *F01D 21/00* | (2006.01) |
| *G01P 3/16* | (2006.01) |
| *G01P 3/22* | (2006.01) |
| *G01P 3/488* | (2006.01) |

(52) U.S. Cl.
CPC .............. *G01P 3/44* (2013.01); *F01D 21/003* (2013.01); *G01P 3/16* (2013.01); *G01P 3/22* (2013.01); *G01P 3/488* (2013.01); *F05D 2220/32* (2013.01); *F05D 2270/304* (2013.01)

(58) Field of Classification Search
CPC ................................. G01P 3/44; F01D 21/003
USPC ...................................................... 73/514.39
See application file for complete search history.

(56) References Cited

U.S. PATENT DOCUMENTS

| | | |
|---|---|---|
| 2,987,671 A | 6/1961 | Williams |
| 4,506,339 A | 3/1985 | Kuhnlein |
| 4,689,557 A | 8/1987 | Smith et al. |

(Continued)

FOREIGN PATENT DOCUMENTS

DE 3630062 A1 3/1988

OTHER PUBLICATIONS

Extended European Search Report, European Application No. 16166408. 1-1568, dated Oct. 25, 2016, 8 pages.

(Continued)

*Primary Examiner* — Tarun Sinha
(74) *Attorney, Agent, or Firm* — Barnes & Thornburg LLP

(57) ABSTRACT

A speed sensor system for measuring rotational speed includes a magnetic sensor and a cylindrical drum rotatable around the magnetic sensor. The cylindrical drum includes several axially extending members disposed circumferentially around a first edge of the cylindrical drum. The magnetic sensor is configured to generate an electrical output that indicates each passage of each of the axially extending members around the magnetic sensor as the cylindrical drum rotates around the magnetic sensor. The axially extending members are adapted to deflect radially outwards away from the magnetic sensor in response to an increased rotational speed of the cylindrical drum. The deflection of the axially extending members provides voltage regulation functionality that maintains voltage outputs of the magnetic sensor within a desired operational range.

17 Claims, 3 Drawing Sheets

(56) References Cited

U.S. PATENT DOCUMENTS

| | | | |
|---|---|---|---|
| 5,200,698 | A | 4/1993 | Thibaud |
| 5,508,608 | A * | 4/1996 | Goossens ............. F16C 33/723 |
| | | | 310/155 |
| 6,181,127 | B1 | 1/2001 | Wallrafen |
| 6,541,959 | B2 | 4/2003 | Gudgeon et al. |
| 6,650,106 | B2 | 11/2003 | Daalmans et al. |
| 6,885,187 | B2 | 4/2005 | Duenisch et al. |
| 2004/0061493 | A1 | 4/2004 | Fishburn et al. |
| 2013/0118856 | A1* | 5/2013 | Long ...................... F16D 43/18 |
| | | | 192/104 B |
| 2014/0028293 | A1 | 1/2014 | Johnson et al. |
| 2014/0266156 | A1 | 9/2014 | Warner |

OTHER PUBLICATIONS

Office Action from the European Patent Office dated Feb. 1, 2018 and issued in connection with European Patent Application No. 16166408.1.

* cited by examiner

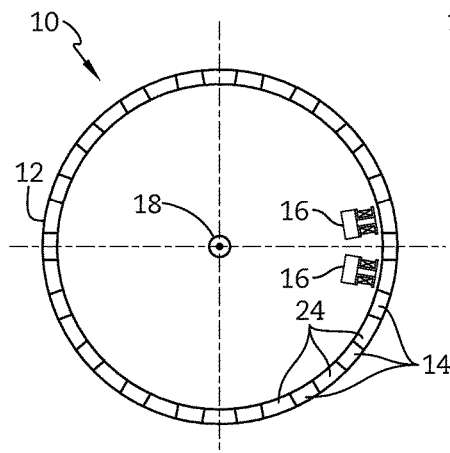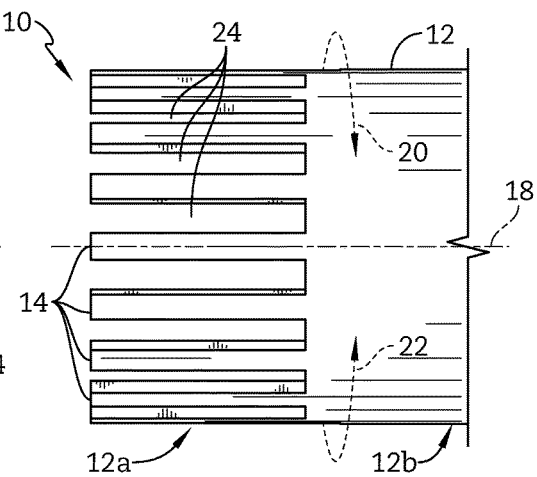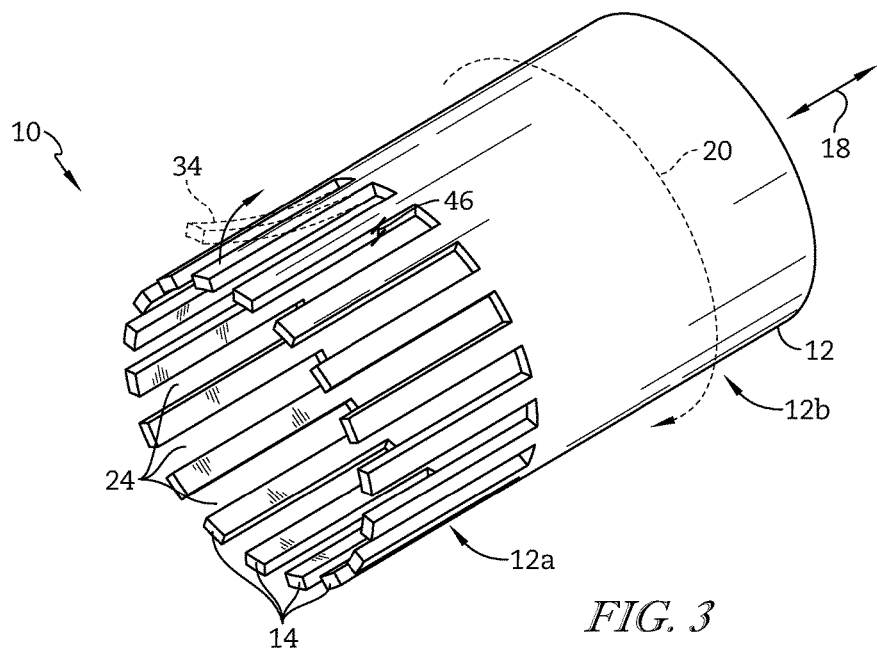

SPEED SENSING SYSTEM

CROSS REFERENCE TO RELATED APPLICATIONS

This application claims priority to and the benefit of U.S. Provisional Patent Application No. 62/160,205, filed 12 May 2015, the disclosure of which is now expressly incorporated herein by reference.

FIELD OF THE DISCLOSURE

The present disclosure relates generally to speed sensing systems, and more specifically to rotational speed sensing systems using magnetic sensors.

BACKGROUND

Magnetic speed sensor systems may be used to measure the rotational speed of mechanical components, such as turbines, shafts, or other components of gas turbine engines. Some magnetic speed sensor system may include an exciter wheel and a magnetic sensor. However, such systems can produce compromised speed information when used in high speed or thermally dynamic environments.

SUMMARY

The present disclosure may comprise one or more of the following features and combinations thereof.

A speed sensor system in accordance with the present disclosure includes a magnetic sensor and a cylindrical drum rotatable around the magnetic sensor. The cylindrical drum includes a plurality of axially extending members disposed circumferentially around a first edge of the cylindrical drum. The magnetic sensor is configured to generate an electrical output that indicates each passage of each of the axially extending members around the magnetic sensor as the cylindrical drum rotates around the magnetic sensor. The axially extending members are adapted to deflect radially outwards away from the magnetic sensor in response to an increased rotational speed of the cylindrical drum. In some embodiments, the deflection of the axially extending members may operate to regulate voltage outputs of the magnetic sensor.

In some embodiments, the magnetic sensor may be configured to generate voltage spikes in response to each passage of each of the plurality of axially extending members around the magnetic sensor. In some embodiments, the voltage spikes may have magnitudes that are functions of air gaps between the magnetic sensor and corresponding axially extending members, and upon deflection of the corresponding axially extending members, the air gaps may increase. In some embodiments, in a resting state, the air gaps may be each less than about 0.5 mm, and upon deflection of the axially extending members, the air gaps each may increase to more than about 1 mm.

In some embodiments, the magnetic sensor may be positioned in a location within the cylindrical drum such that the magnetic sensor is circumferentially surrounded by the axially extending members. In some embodiments, the magnetic sensor may be positioned such the magnetic sensor remains surrounded by the axially extending members in response to axial displacement of the magnetic sensor either towards the first edge of the cylindrical drum or away from the first edge of the cylindrical drum.

According to another aspect of the present disclosure, a method of assembling a speed sensor system includes affixing a magnetic sensor to a surface; fabricating a cylindrical drum to include a plurality of axially extending members disposed circumferentially around a first edge of the cylindrical drum, the plurality of axially extending members having flexibility sufficient to deflect radially outwards away from the magnetic sensor in response to increasing rotational speed of the cylindrical drum; and rotatably mounting the cylindrical drum around the magnetic sensor, wherein the magnetic sensor generates an electrical output upon each passage around the magnetic sensor of each of the axially extending members.

In some embodiments, fabricating the cylindrical drum such that the plurality of axially extending members have flexibility may include shaping and sizing the plurality of axially extending members to achieve predetermined amounts of deflection at given rotational speeds.

In some embodiments, mounting the cylindrical drum may include mounting the cylindrical drum such that the plurality of axially extending members circumferentially surround the magnetic sensor. In some embodiments, mounting the cylindrical drum may include mounting the cylindrical drum such that the plurality of axially extending members remain surrounding the magnetic sensor in response to axial displacement of the magnetic sensor.

In some embodiments, the method may further include measuring an amount of axial displacement of the magnetic sensor based on voltage readings of the magnetic sensor.

According to another aspect of the present disclosure, a gas turbine engine has a speed sensor system. The speed sensor system includes a magnetic sensor and a cylindrical drum rotatable around the magnetic sensor. The cylindrical drum includes a plurality of axially extending members disposed circumferentially around a first edge of the cylindrical drum. The magnetic sensor is configured to generate an electrical output that indicates each passage of each of the axially extending members around the magnetic sensor as the cylindrical drum rotates around the magnetic sensor. The axially extending members are adapted to deflect radially outwards away from the magnetic sensor in response to an increased rotational speed of the cylindrical drum. In some embodiments, the deflection of the axially extending members may operate to regulate voltage outputs of the magnetic sensor.

In some embodiments, the magnetic sensor may be configured to generate voltage spikes in response to each passage of each of the plurality of axially extending members around the magnetic sensor. In some embodiments, the voltage spikes may have magnitudes that are functions of air gaps between the magnetic sensor and corresponding axially extending members, and upon deflection of the corresponding axially extending members, the air gaps may increase. In some embodiments, in a resting state, the air gaps may be each less than about 0.5 mm, and upon deflection of the axially extending members, the air gaps each may increase to more than about 1 mm.

In some embodiments, the magnetic sensor may be positioned in a location within the cylindrical drum such that the magnetic sensor is circumferentially surrounded by the axially extending members. In some embodiments, the magnetic sensor may be positioned such the magnetic sensor remains surrounded by the axially extending members in response to axial displacement of the magnetic sensor either towards the first edge of the cylindrical drum or away from the first edge of the cylindrical drum.

These and other features of the present disclosure will become more apparent from the following description of the illustrative embodiments.

BRIEF DESCRIPTION OF THE DRAWINGS

FIG. 1 is a front view of a speed sensor system in accordance with the present disclosure showing that the speed sensor system includes one or more magnetic sensors having respective magnets and coils and a cylindrical drum rotatable around the magnetic sensors and having a plurality of axially extending members disposed circumferentially around a first edge of the cylindrical drum;

FIG. 2 is a side view of the speed sensor system shown in FIG. 1;

FIG. 3 is a perspective view of the speed sensor system shown in FIGS. 1-2 and suggesting that in response to increasing rotational speed of the cylindrical drum, the axially extending members deflect outwards to increase air gaps and provide voltage regulation;

DETAILED DESCRIPTION OF THE DRAWINGS

Figure 4:
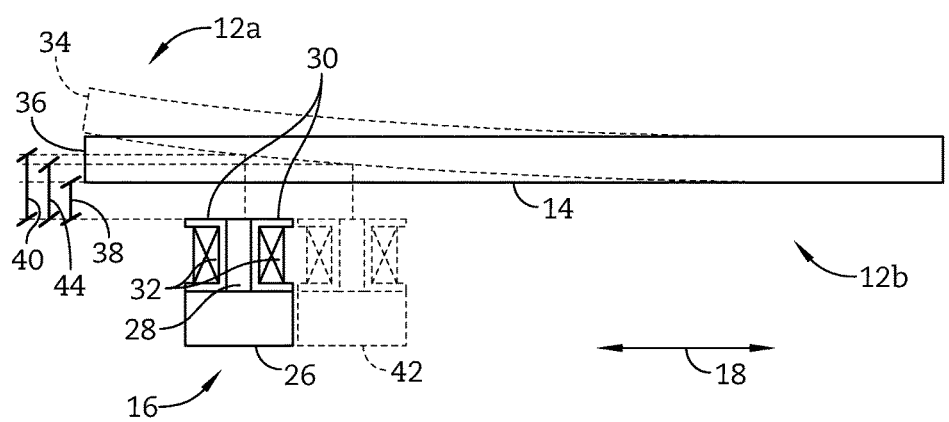
FIG. 4 is a side view of one of the magnetic sensors and one of the axially extending members of FIGS. 1-3 showing that an air gap between the magnetic sensor and the axially extending member increases in response to outward deflection of the axially extending member and further suggesting that the air gap may vary upon axial displacement of the magnetic sensor.

For the purposes of promoting an understanding of the principles of the disclosure, reference will now be made to a number of illustrative embodiments illustrated in the drawings and specific language will be used to describe the same.

A speed sensor system 10 in accordance with the present disclosure is shown in FIGS. 1-4. The speed sensor system 10 includes a cylindrical drum 12 having axially extending members 14 emanating from a cylindrical region 12b and disposed circumferentially around a deflecting region 12a, as shown in FIGS. 1-3. The axially extending members 14 surround one or more magnetic sensors 16 that are positioned within the cylindrical drum 12. In use, the cylindrical drum 12 may rotate about an axis of rotation 18. As the rotational speed of cylindrical drum 12 increases, the axially extending members 14 deflect radially outwards, away from the magnetic sensors 16 due to centripetal loads, as shown in FIGS. 3-4. This outward deflection increases the size of air gaps between the magnetic sensors 16 and the axially extending members 14, as shown in FIG. 4. As further described below in connection with FIG. 5, the larger air gaps provide voltage regulation functionality.

In more detail with reference to FIGS. 1-3, the speed sensor system 10 includes one or more magnetic sensors 16 and the cylindrical drum 12. The magnetic sensors 16 are shown in FIG. 1 but are omitted for clarity from FIGS. 2-3. The magnetic sensors 16 can be mounted to any suitable surface, and are preferably mounted to a surface that is stationary relative to the cylindrical drum 12. The cylindrical drum 12 is rotatable around the magnetic sensors 16. For example, cylindrical drum 12 may be mounted to a shaft (not shown) that allows cylindrical drum 12 to rotate about the rotational axis 18 in a clockwise direction 20 or a counterclockwise direction 22, around the magnetic sensors 16.

As described above, the cylindrical drum 12 includes the deflecting region 12a and the cylindrical region 12b. In the deflecting region 12a, the cylindrical drum 12 includes the axially extending members 14 with notches 24 disposed therebetween. The axially extending members 14 emanate from the cylindrical region 12b and are disposed circumferentially around the cylindrical drum 12 in the deflecting region 12a. The notches 24 are disposed between the axially extending members 14 in a circumferential direction, resulting in circumferential discontinuities about the cylindrical drum 12 in the deflecting region 12a. The notches 24 end at the boundary between the deflecting region 12a and the cylindrical region 12b, such that cylindrical region 12b has a substantially continuous cylindrical shape.

An illustrative magnetic sensor 16 is shown in more detail in FIG. 4. As shown, each of the magnetic sensors 16 includes a magnet 26, a center pole 28, and a bobbin 30, around which is wound a coil 32. Referring again to FIGS. 1-4, as the cylindrical drum 12 rotates around the magnetic sensors 16, each of the axially extending members 14 and each of the notches 24 pass the magnetic sensors 16.

With reference to an exemplary magnetic sensor 16, upon passage of the cylindrical drum 12 around the magnetic sensor 16, the axially extending members 14 modulate the magnetic flux in a proximity of the coil 32. This modulates a voltage induced across the coil 32. For example, when an axially extending member 14 is positioned directly above the center pole 28, as shown in FIG. 4, the voltage induced across the coil 32 may achieve a relative maximum. However, when a notch 24 is positioned directly above the center pole 28, the voltage induced across the coil 32 may achieve a relative minimum. The resulting voltage waveform can be processed to determine its frequency, which can be correlated to a rotational speed of the cylindrical drum 12. More particularly, a low-frequency voltage waveform generated by the magnetic sensors 16 correlates to a lower rotational speed, and a high-frequency voltage waveform generated by the magnetic sensors 16 correlates to a higher rotational speed.

As the rotational speed of the cylindrical drum 12 increases, the axially extending members 14 deflect radially outwards, away from the magnetic sensors 16 due to increasing centripetal loads on the axially extending members 14. An illustrative deflected position 34 is shown in FIG. 3 and FIG. 4. When the axially extending members 14 are in the deflected position 34, air gaps (to be illustrated and discussed further below in connection with FIG. 4) between the axially extending members 14 and the magnetic sensors 16 increase, reducing the voltage induced across the coil 32. The outward deflection of the axially extending members 14 thus provides voltage regulation functionality in response to increasing rotational speeds, avoiding high and potentially excessive voltage outputs that may occur in conventional speed sensor systems.

Because centripetal loads on the axially extending members 14 increase as the rotational speed of the cylindrical drum 12 increases, the axially extending members 14 will generally deflect farther away as the rotational speed of the cylindrical drum 12 continues to increase. Thus, the speed sensor system 10 provides additional voltage regulation automatically in response to continued increases in rotational speed of the cylindrical drum 12.

FIG. 4 shows in more detail the manner by which deflection of the axially extending members 14 increases air gaps between an illustrative axially extending member 14 and magnetic sensor 16. In this example, the axially extending member 14 is positioned directly above the center pole 28 such that the voltage across the coil 32 is at a relative maximum.

When the cylindrical drum 12 is stationary, the axially extending member 14 does not deflect and assumes a substantially horizontal position 36. When the axially extending member 14 is in the substantially horizontal position 36, there exists a static air gap 38 between the axially extending member 14 and the magnetic sensor 16. When the cylindrical drum 12 is rotating, the axially extending member 14 deflects radially outward due to centripetal loads and assumes the deflected position 34. When the axially extending member 14 is in the deflected position 34, there exists an enlarged, dynamic air gap 40. Because the voltage induced across the coil 32 is, in part, a function of the dynamic or static air gaps 38, 40, the voltage induced across the coil 32 will be reduced when the axially extending member 14 assumes the deflected position 34. This self-compensates for increased voltages that may otherwise result in response to increasing rotational speeds of the cylindrical drum 12.

Table 1 provides exemplary comparison data showing peak-to-peak voltages generated by a magnetic sensor of a conventional speed sensor system and peak-to-peak voltages generated by a magnetic sensor 16 of the speed sensor system 10. Data set forth in Table 1 is merely illustrative of the voltage regulating functionality of the speed sensor system 10, and is not intended to limit the applicability of the speed sensor system 10 to a wide variety of operating environments and parameters.

TABLE 1

Voltages generated by speed sensor systems as various frequencies.

| Frequency of voltage waveform (Hz) | Rotational Speed (RPM) | Volts (peak-to-peak) of voltage waveform using conventional speed sensor system (air gap of 0.5 mm) | Volts (peak-to-peak) of voltage waveform using speed sensor system 10 |
|---|---|---|---|
| 367 | 1000 | 1.74 | 1.75 |
| 1833 | 5000 | 8.71 | 8.56 |
| 3665 | 10000 | 17.43 | 10.22 |
| 5498 | 15000 | 26.14 | 7.12 |
| 7330 | 20000 | 34.85 | 2.86 |

As shown, at elevated rotational speeds, the magnetic sensor of the conventional speed sensor system generates increasingly high peak-to-peak voltages that may ultimately exceed an appropriate operational range. In contrast, at elevated rotational speeds, the magnetic sensor 16 of the speed sensor system 10 generates regulated peak-to-peak voltages that stay within an appropriate operational range for the speed sensor system 10.

Figure 5:
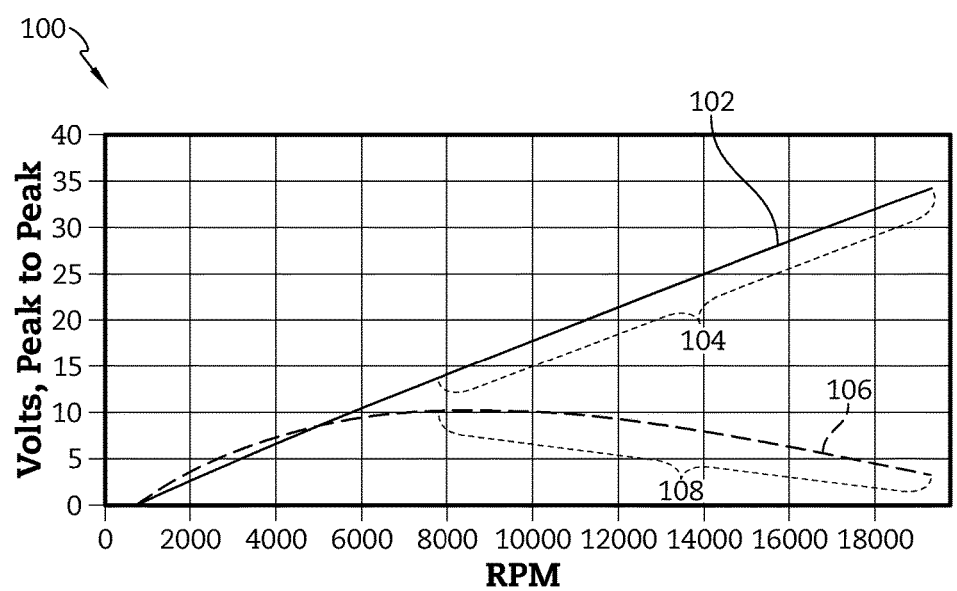
FIG. 5 is a plot of peak-to-peak voltage output as a function of rotational speed for both a conventional speed sensor system and the speed sensor system of FIGS. 1-3 and showing that the speed sensor system of FIGS. 1-3 regulates peak-to-peak voltage in response to increasing rotational speed.

FIG. 5 further illustrates the voltage regulating functionality of the speed sensor system 10 in one exemplary usage scenario. FIG. 5 shows a plot 100 of volts (peak-to-peak) as a function of rotational speed. Curve 102 shows how peak-to-peak voltage of a conventional speed sensor system increases as rotational speed of an exciter wheel increases. There may be a range 104 in which the conventional speed sensor system generates voltages that exceed an appropriate operating range, compromising the effectiveness of the conventional speed sensor system.

Curve 106 shows how peak-to-peak voltage of the speed sensor system 10 is regulated as the rotational speed of the cylindrical drum 12 increases. In a regulating range 108, peak-to-peak voltage decreases in response to increasing rotational speed due to deflection of the axially extending members 14.

In addition to providing voltage regulation functionality, the speed sensor system 10 can accommodate axial displacement of the magnetic sensors 16 and/or the cylindrical drum 12, without compromising its ability to accurately measure rotational speed. In certain conditions the cylindrical drum 12 and/or the magnetic sensors 16 may be displaced along the axis of rotation 18, as shown in FIGS. 1-4. This axial displacement may arise due to a number of factors, such as mechanical imprecisions that amplify over time during operating conditions or thermal growth that occurs during operating conditions. Due to the geometry of the cylindrical drum 12 and the axially extending members 14, such axial displacement will generally not misalign the magnetic sensors 16 from the axially extending members 14. Instead, axial displacement merely results in a differential air gap between the magnetic sensors 16 and the axially extending members 14, as shown in FIG. 4.

For example, FIG. 4 illustrates a circumstance in which the magnetic sensor 16 and the cylindrical drum 12 have been relatively displaced along the axis of rotation 18 such that the magnetic sensor 16 is positioned more closely towards the cylindrical region 12*b*, in an axially displaced position 42. When the axially extending member 14 is in the deflected position 34 and the magnetic sensor 16 has been axially displaced to the axially displaced position 42, a differential air gap 44 exists, rather than the previously-described dynamic air gap 40.

Because the differential air gap 44 is smaller than the dynamic air gap 40, the magnetic sensor 16 may produce a larger voltage. However, because rotational speed measurements are based on frequency of voltage waveforms rather than amplitude, the voltage difference caused by the differential air gap 44 as compared to the dynamic air gap 40 may not have a substantial impact on the speed-sending functionality of the speed sensor system 10.

In certain embodiments, the speed sensor system 10 may be used to measure a quantity of axial displacement between the magnetic sensor 16 and the cylindrical drum 12. To do so, the speed sensor system 10 may measure the frequency of the voltage waveform generated by the magnetic sensor 16 to determine the rotational speed of the cylindrical drum 12. Based on the determined rotational speed, the speed sensor system 10 may determine the expected peak-to-peak voltage of the voltage waveform generated by the magnetic sensor 16. For example, the curve 106 of FIG. 5 shows expected peak-to-peak voltages for given rotational speeds.

As explained above, if the magnetic sensor 16 and the cylindrical drum 12 are axially displaced from one another, the air gap between them will vary, as illustrated in connection with the air gaps 40, 44 of FIG. 4. Changing the air gap may alter the peak-to-peak voltage generated by the magnetic sensor 16—i.e., the measured peak-to-peak voltage may be higher than expected as the magnetic sensor 16 is displaced towards the cylindrical region 12*b*, and may be lower than expected as the magnetic sensor 16 is displaced away from the cylindrical region 12*b*. The speed sensor system 10 can quantify the difference in measured voltage from the expected voltage, and correlate that difference in measured voltage to a determination of the amount of axial displacement.

In response to detecting axial displacement, the speed sensor system 10 may issue a notification through appropriate electrical signals indicating that axial displacement has occurred. If axial displacement reaches a critical threshold where operation of the speed sensor system 10 may be compromised (e.g., where the magnetic sensor 16 is in danger of being axially displaced entirely outside the range of the deflecting region 12a), the speed sensor system 10 may issue a warning indicating to an operator that adjustments may be required. Alternatively, the speed sensor system 10 may include automated mechanical components that automatically readjust positioning of the magnetic sensor 16 and/or the cylindrical drum 12 to maintain appropriate axial positioning in response to axial displacement measurements.

The cylindrical drum 12 may be fabricated from any suitable material that induces magnetic flux variations in a proximity of the coil 32, and in exemplary embodiments is made of steel. The magnetic sensor 16, including the magnet 26, the center pole 28, the bobbin 30, and the coil 32, may be fabricated from any set of materials suitable for use in magnetic circuits.

The cylindrical drum 12 may be fabricated such that the axially extending members 14 undergo predetermined amounts of deflection at given rotational speeds. If a thickness 46 of the axially extending members 14, best shown in FIG. 3, is reduced, the axially extending members 14 may deflect more readily, providing increased voltage regulation functionality. Similarly, if a more pliable material is selected for fabrication of the cylindrical drum 12, the axially extending members 14 may deflect more readily, providing increased voltage regulation functionality.

Dimensions and relative positioning of the cylindrical drum 12 and the magnetic sensor 16 may vary and may be tailored based on an application at hand. In illustrative embodiments, the speed sensor system 10 is used to measure rotational speed of mechanical components in a gas turbine engine (e.g., rotational speed of turbines, shafts, etc.).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A speed sensor system for measuring rotational speed, the speed sensor system comprising:
    a magnetic sensor; and
    a cylindrical drum rotatable around the magnetic sensor; wherein
        the cylindrical drum includes a plurality of axially extending members disposed circumferentially around a first edge of the cylindrical drum;
        the magnetic sensor is configured to generate an electrical output that indicates each passage of each of the axially extending members around the magnetic sensor as the cylindrical drum rotates around the magnetic sensor; and
        the axially extending members are adapted to deflect radially outwards away from the magnetic sensor in response to an increased rotational speed of the cylindrical drum wherein the deflection of the axially extending members operates to regulate voltage outputs of the magnetic sensor.

2. The speed sensor system of claim 1, wherein the magnetic sensor is configured to generate voltage spikes in response to each passage of each of the plurality of axially extending members around the magnetic sensor.

3. The speed sensor system of claim 2, wherein:
    the voltage spikes have magnitudes that are functions of air gaps between the magnetic sensor and corresponding axially extending members; and
    upon deflection of the corresponding axially extending members, the air gaps increase.

4. The speed sensor system of claim 3, wherein:
    in a resting state, the air gaps are each less than about 0.5 mm, and
    upon deflection of the axially extending members, the air gaps each increase to more than about 1 mm.

5. The speed sensor system of claim 1, wherein the magnetic sensor is positioned in a location within the cylindrical drum such that the magnetic sensor is circumferentially surrounded by the axially extending members.

6. The speed sensor system of claim 5, wherein the magnetic sensor is positioned such the magnetic sensor remains surrounded by the axially extending members in response to axial displacement of the magnetic sensor either towards the first edge of the cylindrical drum or away from the first edge of the cylindrical drum.

7. A method of assembling a speed sensor system, the method comprising:
    affixing a magnetic sensor to a surface;
    fabricating a cylindrical drum to include a plurality of axially extending members disposed circumferentially around a first edge of the cylindrical drum, the plurality of axially extending members having flexibility sufficient to deflect radially outwards away from the magnetic sensor in response to increasing rotational speed of the cylindrical drum; and
    rotatably mounting the cylindrical drum around the magnetic sensor, wherein the magnetic sensor generates an electrical output upon each passage around the magnetic sensor of each of the axially extending members, wherein the deflection of the axially extending members operates to regulate voltage outputs of the magnetic sensor.

8. The method of claim 7, wherein fabricating the cylindrical drum such that the plurality of axially extending members have flexibility comprises shaping and sizing the plurality of axially extending members to achieve predetermined amounts of deflection at given rotational speeds.

9. The method of claim 7, wherein mounting the cylindrical drum comprises mounting the cylindrical drum such that the plurality of axially extending members circumferentially surround the magnetic sensor.

10. The method of claim 9, wherein mounting the cylindrical drum comprises mounting the cylindrical drum such that the plurality of axially extending members remain surrounding the magnetic sensor in response to axial displacement of the magnetic sensor.

11. The method of claim 10, further comprising measuring an amount of axial displacement of the magnetic sensor based on voltage readings of the magnetic sensor.

12. A gas turbine engine having a speed sensor system, the speed sensor system comprising:
    a magnetic sensor; and
    a cylindrical drum rotatable around the magnetic sensor; wherein the cylindrical drum includes a plurality of axially extending members disposed circumferentially around a first edge of the cylindrical drum;

the magnetic sensor is configured to generate an electrical output that indicates each passage of each of the axially extending members around the magnetic sensor as the cylindrical drum rotates around the magnetic sensor; and the axially extending members are adapted to deflect radially outwards away from the magnetic sensor in response to an increased rotational speed of the cylindrical drum wherein the deflection of the axially extending members operates to regulate voltage outputs of the magnetic sensor.

13. The gas turbine engine of claim 12, wherein the magnetic sensor is configured to generate voltage spikes in response to each passage of each of the plurality of axially extending members around the magnetic sensor.

14. The gas turbine engine of claim 13, wherein:

the voltage spikes have magnitudes that are functions of air gaps between the magnetic sensor and corresponding axially extending members; and upon deflection of the corresponding axially extending members, the air gaps increase.

15. The gas turbine engine of claim 14, wherein:

in a resting state, the air gaps are each less than about 0.5 mm, and upon deflection of the axially extending members, the air gaps each increase to more than about 1 mm.

16. The gas turbine engine of claim 12, wherein the magnetic sensor is positioned in a location within the cylindrical drum such that the magnetic sensor is circumferentially surrounded by the axially extending members.

17. The gas turbine engine of claim 16, wherein the magnetic sensor is positioned such the magnetic sensor remains surrounded by the axially extending members in response to axial displacement of the magnetic sensor either towards the first edge of the cylindrical drum or away from the first edge of the cylindrical drum.

* * * * *